United States Patent
Jahn (10) Patent No.: US 9,057,444 B2
(45) Date of Patent: Jun. 16, 2015

(54) LEAF SEAL

(71) Applicant: ROLLS-ROYCE PLC, London (GB)

(72) Inventor: Ingo Henry Johannes Jahn, Queensland (AU)

(73) Assignee: ROLLS-ROYCE plc, London (GB)

( * ) Notice: Subject to any disclaimer, the term of this patent is extended or adjusted under 35 U.S.C. 154(b) by 128 days.

(21) Appl. No.: 13/904,406

(22) Filed: May 29, 2013

(65) Prior Publication Data

US 2013/0320624 A1    Dec. 5, 2013

(30) Foreign Application Priority Data

May 31, 2012   (GB) .................................. 1209705.1

(51) Int. Cl.
| | |
|---|---|
| *F01D 11/02* | (2006.01) |
| *F01D 11/00* | (2006.01) |
| *F16J 15/32* | (2006.01) |
| *F16J 15/44* | (2006.01) |
| *F16J 15/447* | (2006.01) |

(52) U.S. Cl.
CPC ............. *F16J 15/3292* (2013.01); *F01D 11/02* (2013.01); *F16J 15/3288* (2013.01); *F05D 2240/57* (2013.01); *F05D 2240/59* (2013.01); *F01D 11/001* (2013.01)

(58) Field of Classification Search
CPC .. F16J 15/3288; F16J 15/3292; F01D 11/001; F01D 11/02; F05D 2240/57; F05D 2240/59
USPC ......................................................... 277/355
See application file for complete search history.

(56) References Cited

U.S. PATENT DOCUMENTS

| | | | |
|---|---|---|---|
| 6,267,381 B1 * | 7/2001 | Wright ........................ | 277/355 |
| 7,066,468 B2 * | 6/2006 | Uehara et al. ................ | 277/355 |
| 7,413,194 B2 * | 8/2008 | Wright et al. ................ | 277/355 |

(Continued)

FOREIGN PATENT DOCUMENTS

| | | |
|---|---|---|
| EP | 1 231 416 A2 | 8/2002 |
| EP | 2 604 894 A1 | 6/2013 |

(Continued)

OTHER PUBLICATIONS

Oct. 9, 2013 European Search Report issued in European Application No. EP 13 16 9762.
Aug. 15, 2012 Great Britain Search Report issued in Great Britain Application No. GB 1209705.1.

*Primary Examiner* — Vishal Patel
*Assistant Examiner* — Nicholas L Foster
(74) *Attorney, Agent, or Firm* — Oliff PLC (57) ABSTRACT

A leaf seal is provided for effecting a seal between two, coaxial, relatively rotating components. The leaf seal has an annular pack of stacked leaves. The pack is mountable to a first one of the components at root portions of the leaves and extends towards the other component such that end edges of the leaves are presented for wiping contact with the other component and, in use, a pressure drop is maintained axially across the pack. The leaf seal has a coverplate at the high or the low pressure side of the pack covering a portion of the radial extent of the pack. Some or all of the leaves have respective abutment formations. Each abutment formation is arranged to abut the coverplate at a stop portion upon radial deflection of the leaf by a predetermined amount to prevent further radial deflection beyond that amount.

12 Claims, 8 Drawing Sheets

(56) References Cited

U.S. PATENT DOCUMENTS

| | | | |
|---|---|---|---|
| 8,517,673 B2* | 8/2013 | Ambrosy et al. | 415/174.2 |
| 8,794,633 B2* | 8/2014 | Williams | 277/355 |
| 2005/0194745 A1 | 9/2005 | Hogg | |
| 2008/0048399 A1* | 2/2008 | Nicholson et al. | 277/355 |
| 2009/0309311 A1 | 12/2009 | Verma et al. | |
| 2013/0154199 A1* | 6/2013 | Williams | 277/549 |

FOREIGN PATENT DOCUMENTS

| | | |
|---|---|---|
| FR | 2 915 548 A1 | 10/2008 |
| JP | A-2009-216241 | 9/2009 |
| WO | WO 2006/016098 A1 | 2/2006 |

* cited by examiner

LEAF SEAL

FIELD OF THE INVENTION

The present invention relates to a leaf seal.

BACKGROUND OF THE INVENTION

Leaf seals may be used to form a seal between two relatively rotating components in order to maintain a relatively high pressure on one side of the seal and a relatively low pressure on the other. A leaf seal is arranged with a large number of typically rectangular leaves which are held at a defined angle to the radial all the way round the seal circumference. The leaves give the seal a low stiffness, and are packed together such that the total leakage through the seal is reduced. Nonetheless, interleaf gaps do provide the seal with a porous aerodynamic working section. Such seals may be used, for example, in gas turbine engines.

Figure 1:
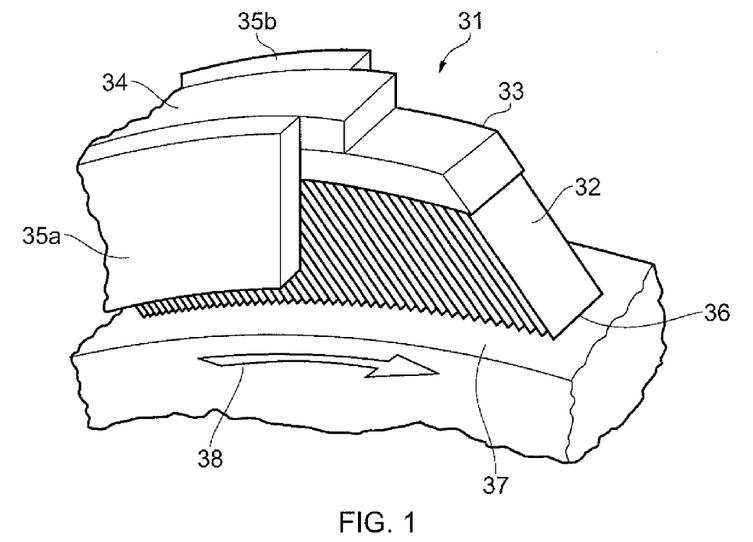
FIG. 1 shows schematically a cut-away perspective view of a portion of a leaf seal.
Figure 2:
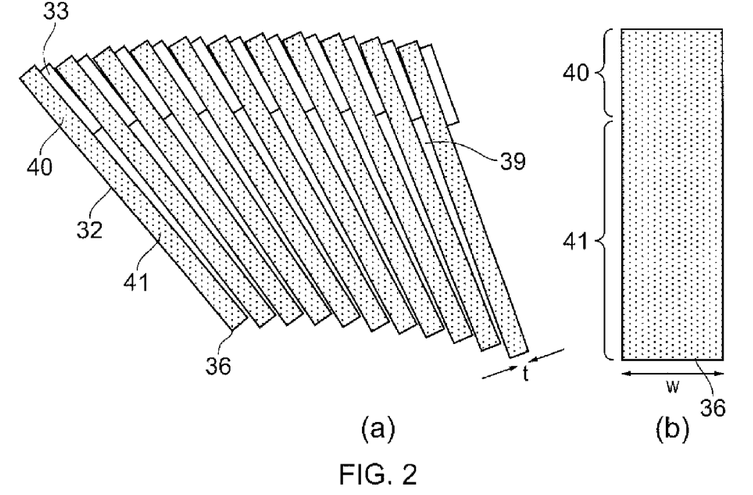

FIG. 1 shows schematically a cut-away perspective view of a portion of a leaf seal 31 comprising a pack of leaves 32. FIG. 2 shows (a) a view along the axial direction of an arc segment of the pack to better show some of the leaves 32 edge-on, and (b) a plan view of a single leaf 32.

The leaves 32 each have a root portion 40 and a working portion 41, and have a width w in the axial direction and a thickness t. The leaves alternate with spacer elements 33 at their root portions 40, and are secured thereat to a backing ring 34 of a housing, which typically also comprises front 35a (high pressure side) and rear (low pressure side) 35b rigid coverplates. The working portions 41 of the leaves 32 present end edges 36 towards a surface 37 of a rotating component (shaft) generally rotating in the direction depicted by arrowhead 38. The leaves 32, and in particular the end edges 36 of the leaves 32, act against the surface 37 in order to create a seal across the assembly 31. Each leaf 32 is sufficiently compliant in order to adjust with rotation of the surface 37, so that a good sealing effect is created. The spacers 33 ensure that flexibility is available to appropriately present the leaves 32 towards the surface 37 which, as illustrated, is generally with an inclined angle between them. The spacers 33 also help to form interleaf gaps 39 between adjacent working portions 41 of the leaves 32. A leakage flow through these gaps 39 is induced by the pressure differential across the seal.

In a conventional leaf seal, such as that shown in FIGS. 1 and 2, the pressure drops from a high pressure on one side of the pack to a low pressure on the other side of the pack. In some circumstances, this pressure drop can contribute to leaf blow-down in which the end edges 36 bear down strongly on the surface 37. Although a limited amount of blow-down is desirable to create a good seal between the end edges 36 and the surface 37, excessive blow-down deflection causes high end edge contact loading and wear. Excessive blow-down deflection can also lead to increased wear of the rotor. The wear of the end edges and/or the rotor can limit the usable life of the seal.

SUMMARY OF THE INVENTION

An aim of the present invention is to provide a leaf seal with a longer useful life.

In a first aspect, the present invention provides a leaf seal for effecting a seal between two, coaxial, relatively rotating components, the leaf seal having an annular pack of stacked leaves, the pack being mountable to a first one of the components at root portions of the leaves and extending towards the other component such that end edges of the leaves are presented for wiping contact with the other component and, in use, a pressure drop is maintained axially across the pack and the leaves are arranged to undergo a predetermined amount of blow-down during normal steady state operating conditions:

wherein the leaf seal further has a coverplate at the high or the low pressure side of the pack, the coverplate covering a portion of the radial extent of the pack; and wherein some or all of the leaves have respective abutment formations;

each abutment formation being arranged to abut the coverplate at a stop portion thereof upon radial deflection of the leaf by a predetermined amount to prevent further radial deflection beyond that amount so as to act as a physical blow-down limiter.

Thus a physical end stop can be created by the abutment formation of the leaf in combination with the stop portion of the coverplate. This physical end stop can act as a blow-down limiter, preventing excessive blow-down loading being applied on to the other component. This can reduce the amount of wear of the end edges and the other component, prolonging the usable lifetime of the seal.

In a second aspect, the present invention provides a gas turbine engine, such as an aero gas turbine engine, having one or more leaf seals according to the first aspect.

In a third aspect, the present invention provides use of the leaf seal of the first aspect to prevent excessive blow-down loading being applied on to the other component. For example, a method of effecting a seal between two, coaxial, relatively rotating components can include: mounting the leaf seal of the first aspect to the two components; and rotating the components and maintaining a pressure drop axially across the pack of stacked leaves, the rotational speed and pressure drop producing blow-down causing the leaves to deflect radially by the predetermined amount, whereby the abutment formations abut the stop portion to prevent further radial deflection beyond that amount.

Optional features of the invention will now be set out. These are applicable singly or in any combination with any aspect of the invention.

Each abutment formation can be arranged to abut the stop portion during normal operation of the seal, e.g. during rotational transients. For example, as blow-down generally increases with increasing axial pressure drop, the predetermined amount of radial deflection can be reached at the highest axial pressure drop experienced during normal operation.

Generally, the amount of radial deflection that can be tolerated in a seal scales with seal radius. For example, if R is the radius of the seal in meters at the end edge of the leaf, the predetermined amount of radial deflection in mm of the leaf measured at the end edge may be at least 0.4R, 0.7R or R. The predetermined amount of radial deflection in mm of the leaf measured at the end edge of the leaf may be at most 5R, 6R or 7R.

Each leaf may have a respective abutment formation.

The abutment formation and stop portion can be located at the high pressure side of the respective leaf or the low pressure side of the leaf. Even if only one coverplate provides the stop portion, the seal may nonetheless have coverplates at both sides of the pack. However, when the seal does have coverplates at both sides, another option is for an abutment formation and corresponding stop portion to be located at both sides of the respective leaf.

The abutment formation can be located at a side edge of the respective leaf between its root portion and its end edge.

The abutment formation may be provided by a step in the side edge of the leaf. In this way, the step may form a leaf which is wider at the root portion than at the end edge.

Another option is for the abutment formation to be provided by a salient or outward projection from the side edge. The leaf can then be the same width at the root portion as at the end edge.

The abutment formation may have an abutment surface that is substantially parallel to the axial direction. Alternatively, the abutment formation may have an abutment surface that is inclined to the axial direction.

The abutment formation may have an abutment surface which is curved.

The stop portion may have a surface that is substantially parallel to the axial direction for contact with the abutment surface of the leaf. Alternatively, the stop portion may have a surface that is inclined to the axial direction for contact with the abutment surface of the leaf.

The stop portion may have a curved surface for contact with the abutment surface of the leaf.

The side edges of each leaf having an abutment formation may taper inwards from the root portion to the end edge.

The clearance radially outwards of the abutment formations may be greater than the clearance between the abutment formations and stop portions in normal use.

The leaf seal can be used, for example, in gas and steam turbines, and jet engines. However, it may also be used in other applications, e.g. where sealing between a high and low pressure region is required along a shaft.

Further optional features of the invention are set out below.

BRIEF DESCRIPTION OF THE DRAWINGS

Embodiments of the invention will now be described by way of example with reference to the accompanying drawings in which:

FIG. 2 shows (*a*) a view along the axial direction of an arc segment of the pack of leaves of the seal of FIG. 1, and (*b*) a plan view of a single leaf of the seal of FIG. 1;

FIG. 5 shows schematically (*a*) a view of plane A-A of the leaf seal of FIG. 4, and (*b*) the view of plane A-A with a pressure load acting on the leaves;

DETAILED DESCRIPTION AND FURTHER OPTIONAL FEATURES OF THE INVENTION

Figure 3:
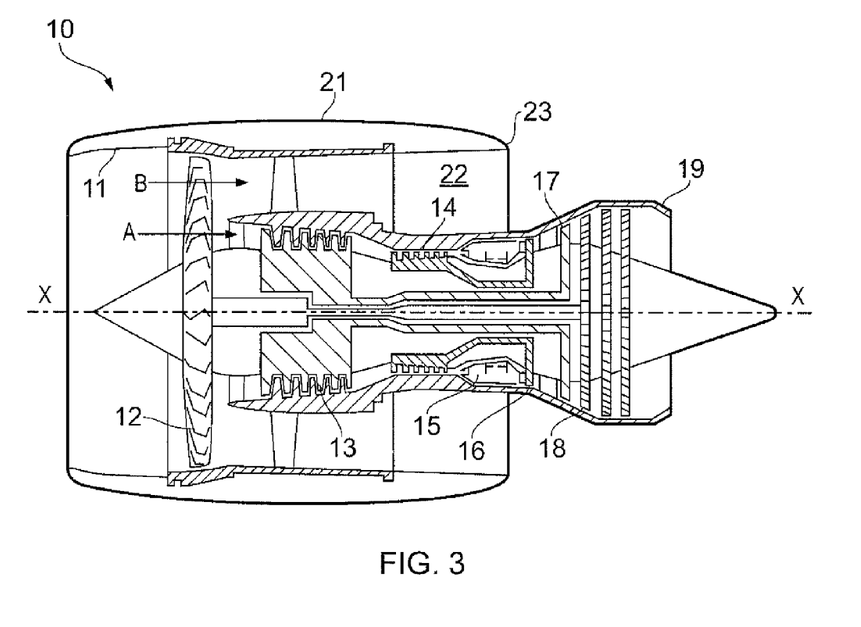
FIG. 3 shows schematically a longitudinal section through a gas turbine engine.

With reference to FIG. 3, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The engine may have one or more leaf seals installed, for example, between an interconnecting shaft and a casing for the shaft.

Figure 4:
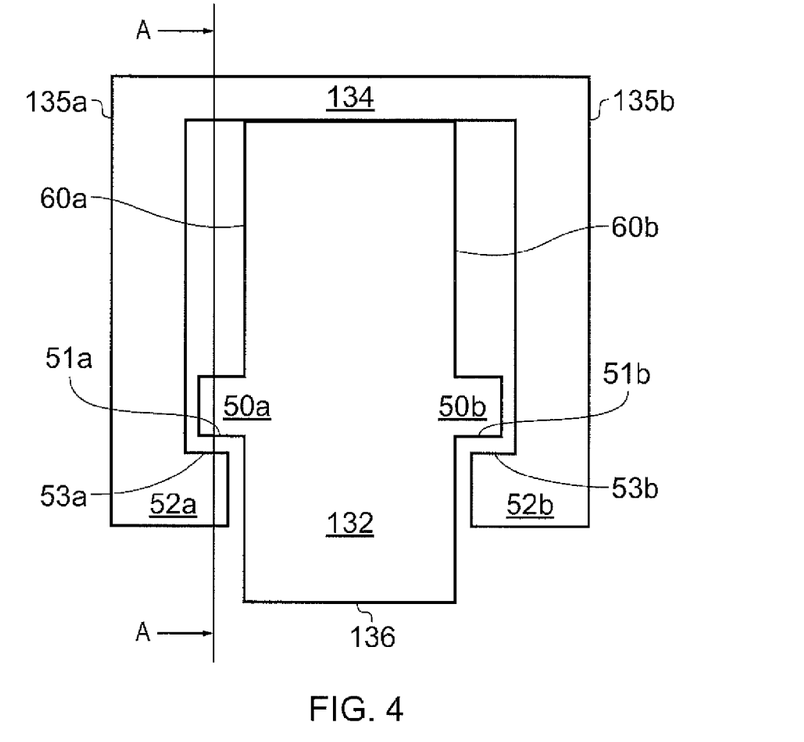
FIG. 4 shows schematically a cross-section parallel to the rotational axis of a leaf seal.

FIG. 4 shows a cross section of a leaf 132 and housing 134 of such a leaf seal.

The leaf seal of FIG. 4 has a circumferential pack of approximately rectangular leaves 132 extending to end edges 136 which make wiping contact with a rotor (e.g. an engine interconnecting shaft). The leaves are held at an inclined angle to the radial. Interleaf gaps are formed between the leaves 132, giving a porous aerodynamic working section and sufficient compliance to adjust to the rotor. Nonetheless, the leaves are packed sufficiently tightly together so that the total leakage through the seal is low.

The housing 134 includes a front (high pressure) coverplate 135*a* and a rear (low pressure) coverplate 135*b* which each cover a portion of the radial extent of the leaf pack. The front coverplate 135*a* includes a stop portion 52*a* with a stop surface 53*a*. The rear coverplate 135*b* includes a stop portion 52*b* with a stop surface 53*b*.

The leaf 132 has a front (high pressure) side edge 60*a* and a rear (low pressure) side edge 60*b*. These edges respectively include front 50*a* and rear 50*b* abutment formations in the form of outwardly projecting salients that cause the leaf to depart from a purely rectangular shape.

Respective abutment surfaces 51*a*, 51*b* at the radially inward sides of the abutment formations 50*a*, 50*b* contact the stop portions 52*a*, 52*b* of the coverplate at stop surfaces 53*a*, 53*b* when the leaf is deflected by a predetermined amount during blow-down. Each abutment formation and its corresponding stop portion can therefore act as a physical blow-down limiter. In order to provide sufficient contact, the radial clearance between the abutment formations 50*a*, 50*b* and the stop portions 52*a*, 52*b* in a non-working state is less than the expected deflection during normal use.

Leaf seals can be designed to undergo a predetermined amount of blow-down during normal steady state operating conditions. Blow-down deflection is proportional to blow-down force acting on the leaf which is proportional to the differential pressure. In the majority of applications there is a range of expected operating conditions for the seal which constitute normal operation. Hence, there will be at least a first operating pressure which induces a first level of blow-down force on the leaves, and a second, higher pressure operating point which induces a greater level of blow-down force.

Ideally a leaf seal will be designed such that the blow-down force is sufficient to substantially close the gap between the edge end 136 of the leaves 132 and the rotor at the lower pressure operating point. However, since the blow-down is proportional to the differential pressure, this means that the blow-down force will be too great at the second, higher pressure operating point. This will result in unnecessarily high rotor torque and wear.

The present invention provides a blow-down limiter in the form of the stop portions 52a,b and abutment formations 50a,b to ensure that at higher pressure condition the leaf deflection is limited after a predetermined amount of pressure differential. As there is no sliding contact between the leaves and the coverplates any further pressure can be better absorbed without excessive and unnecessary wear to the rotor or leaf edge end 136.

The abutment formations 50a,b may also be viewed as a means for reducing the effective free length of leaves 132 at pressures greater than a first predetermined pressure. This limits the amount of radial deflection which can be achieved in comparison to an unrestricted length. Additional blow-down can still be achieved above the first operating point but is limited to the free end beyond the abutment formations 50a,b. Thus the sealing force can be increased at higher pressures if necessary but in a more controlled way.

Figure 5:
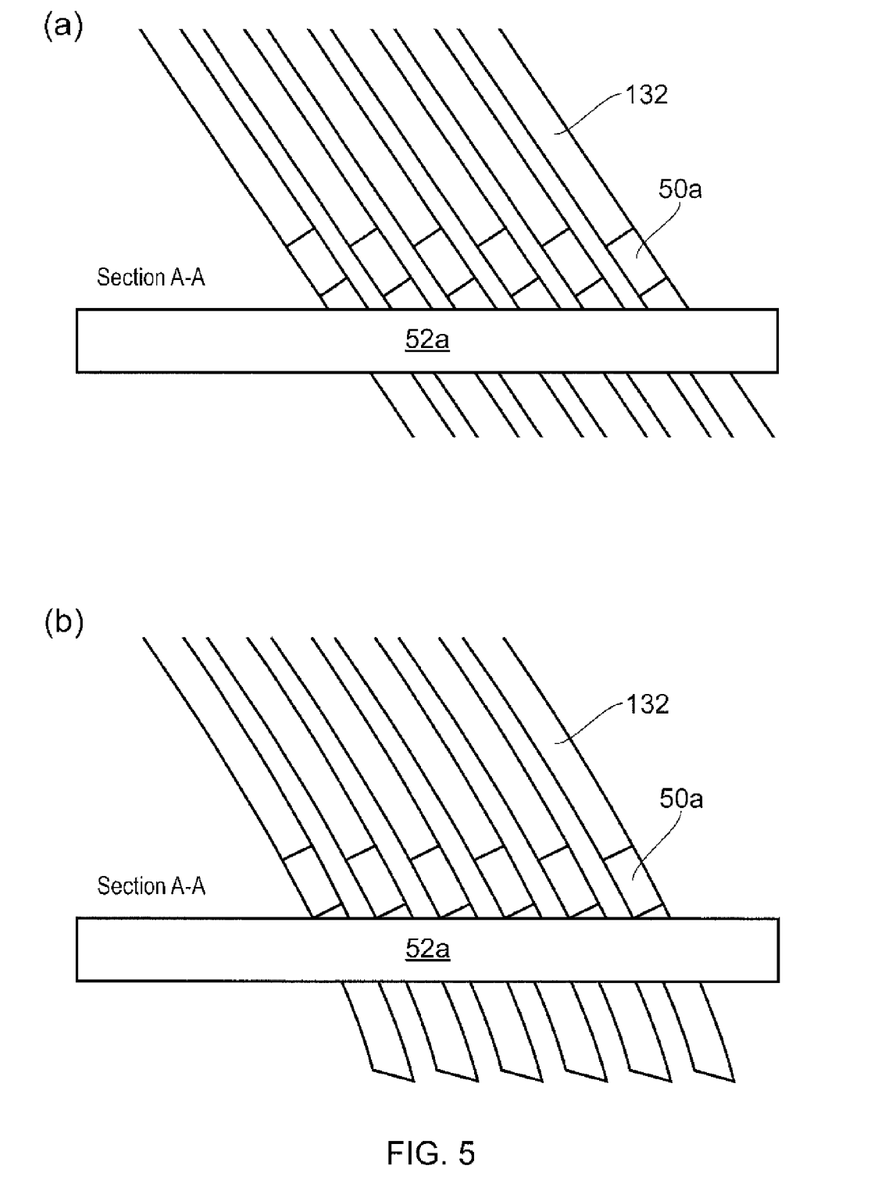

FIG. 5 shows schematically (a) a view of plane A-A of the leaf seal of FIG. 4, and (b) the view of plane A-A with a pressure load acting on the leaves. The pressure load causes blow-down deflection of the leaves 132, the deflection being prevented from causing excessive radial deflection by the abutment formations 50a coming into contact with the stop portion 52a.

The operation of the leaf seal can be described with reference to FIG. 6 which illustrates the effect of different pressures on blow-down on a view of plane A-A of the leaf seal of FIG. 4. More particularly, individual leaves are shown for a range of different pressures ranging from the zero pressure case for the leaf on the far left (corresponding to FIG. 5(a)), to the high pressure case for the leaf on the far right (corresponding to FIG. 5(b)). As the pressure increases, the amount of blow-down increases and deflects the leaves radially inwardly. When the abutment formations 50a, 50b of a respective leaf 132 contact their corresponding stop portions 52a, 52b, further deflection is physically limited. Therefore, once the leaves have deflected by a predetermined amount, $\delta_{lim}$, any additional load acts upon the stop portions. The ability to limit deflection therefore leads to a maximum value of the load which can be exerted on the rotor, thereby reducing the amount of wear of the rotor and of the leaf end edges 136.

Figure 7:
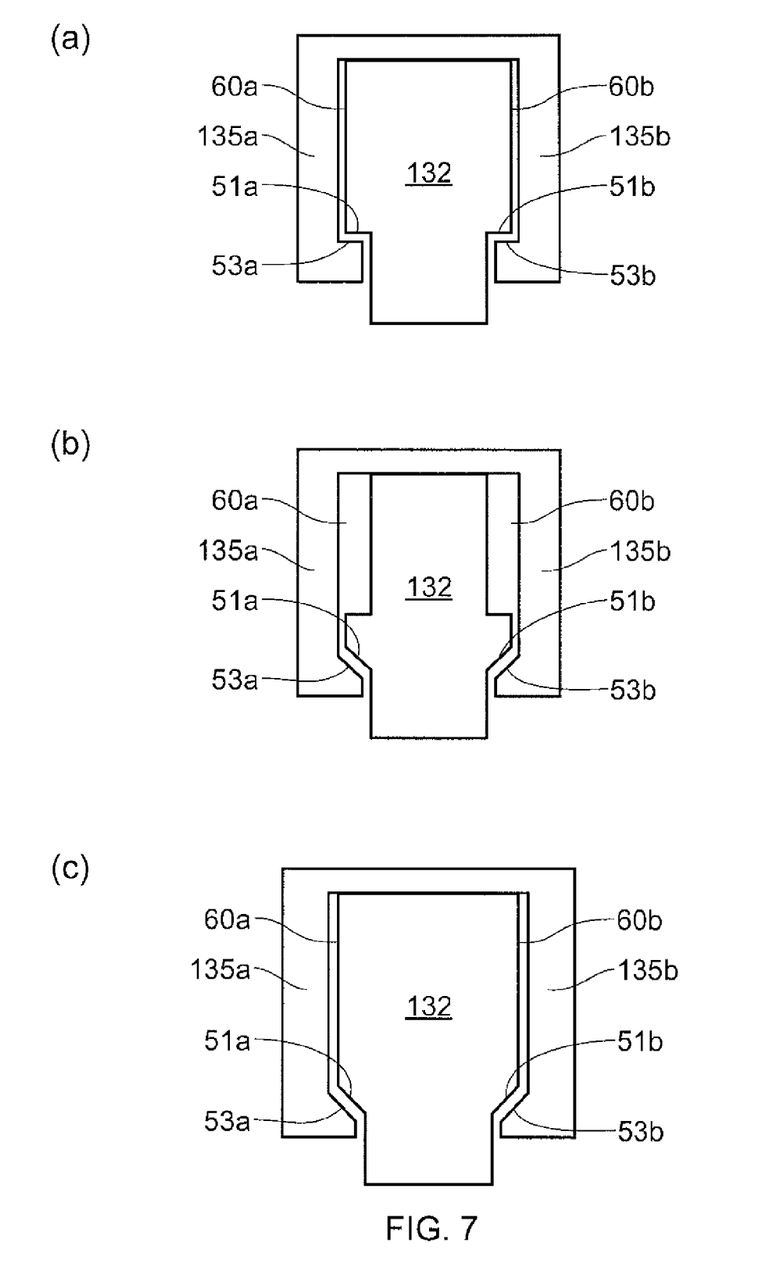
FIG. 7 shows schematically respective cross sections (*a*) to (*c*) of possible shapes of leaves and coverplates for a leaf seal.

FIGS. 7(a) to (c) show possible shapes of leaves 132 and coverplates 135a, 135b. Each leaf 132 has an abutment surface 51a on the abutment formation of the front side edge that contacts a stop surface 53a on the stop portion of the front coverplate 135a when the leaf is deflected radially by the predetermined amount. Similarly, each leaf has an abutment surface 51b on the abutment formation of the rear side edge that contacts a stop surface 53b on the stop portion of the rear coverplate 135b when the leaf is deflected radially by the predetermined amount.

In FIG. 7(a), each of the abutment formations of the front side edge and the rear side edges are a step in the respective side edge. These steps form abutment surfaces 51a and 51b which lie substantially parallel to the axial direction. Corresponding stop surfaces 53a and 53b also lie substantially parallel to the axial direction.

In FIG. 7(b), the side edges 60a, 60b include abutment formations 50a, 50b in the form of outwardly projecting salients. The abutment surfaces 51a, 51b of the abutment formations are inclined to the axial direction. The stop surfaces 53a, 53b are also inclined to the axial direction and the incline of the stop surfaces 53a, 53b can be chosen to match the incline of the abutment surfaces 51a, 51b.

In FIG. 7(c), the abutment formations of the leaf are steps in each of the front and side edges of the leaf. In this case, each step forms an abutment surface 51a, 51b at an incline to the axial direction. The stop surfaces 53a, 53b are also inclined to the axial direction and the incline of the stop surfaces 53a, 53b is chosen to match the incline of the abutment surfaces 51a, 51b.

Figure 8:
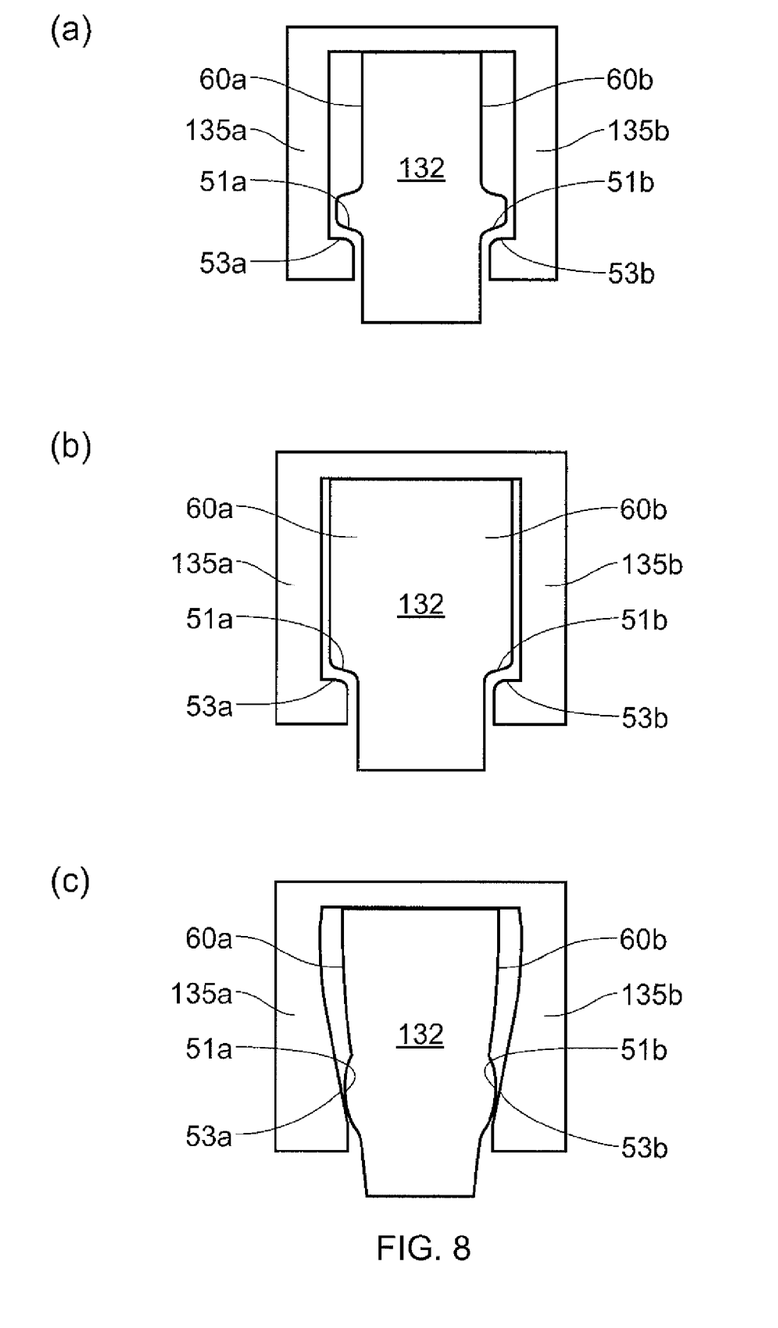
FIG. 8 shows schematically respective cross sections (*a*) to (*c*) of further possible shapes of leaves and coverplates for a leaf seal.

FIGS. 8(a) to (c) also show further possible shapes of leaves 132 and coverplates 135a, 135b. In these possible shapes, each abutment formation 50a, 50b has an abutment surface 51a, 51b which is curved and each coverplate has a curved stop surface 53a, 53b.

In FIG. 8(a) the leaf has abutment formations at the front side edge and the rear side edge in form of outwardly projecting salients whereas in FIG. 8(b) the abutment formation at each of the front and rear edge is a step at the respective side edge. In each of FIGS. 8(a) and 8(b) the stop surfaces 53a and 53b are convex and the abutment surfaces 51a and 51b are concave.

FIG. 8(c) shows a leaf 132 which is tapered so that it is widest at the root portion and narrowest at the end edge 136. The abutment formations each take the form of an outwardly projecting salient with a curved abutment surface 51a, 51b. The front and rear coverplates widen as the leaf tapers such that the inner walls of the coverplate adjacent the curved abutment surfaces form the stop surfaces 53a and 53b.

Figure 6:
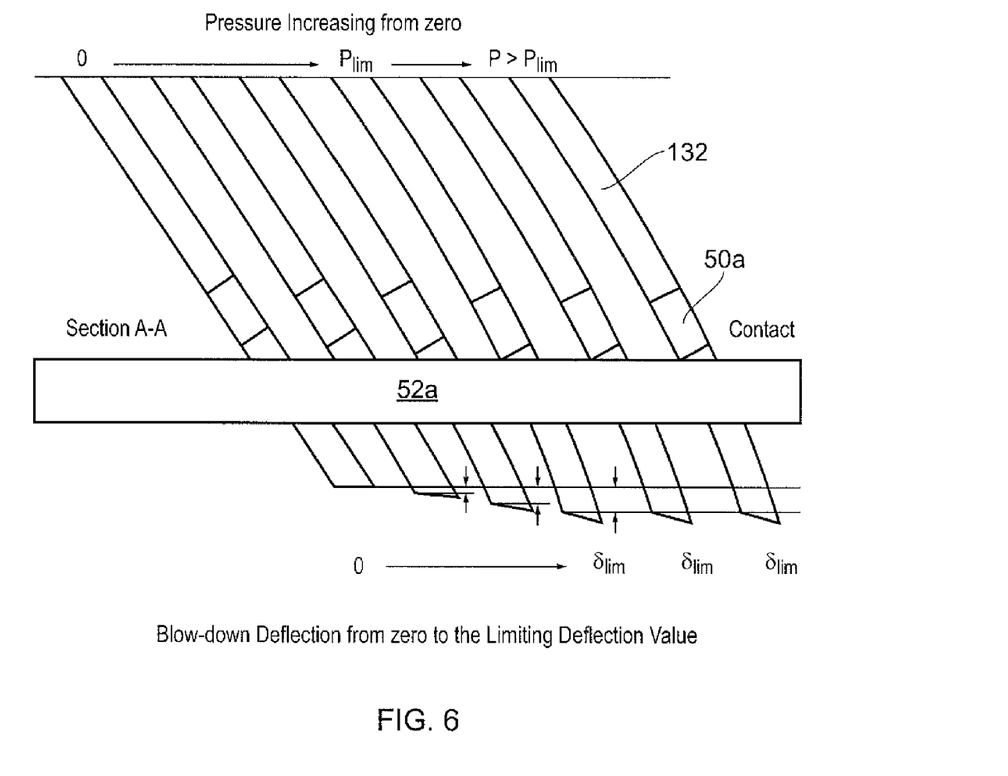
FIG. 6 illustrates the effect of different pressures on blow-down on a view of plane A-A of the leaf seal of FIG. 4.

Like the leaf and coverplate combination shown in FIGS. 4 to 6, each of the leaf and coverplate combinations of FIGS. 7(a) to (c) and FIGS. 8(a) to (c) also has the ability to limit leaf deflection, setting a maximum value of the load which can be exerted on the rotor, and thereby reducing the amount of wear of the rotor and of the leaf end edges.

Figure 9:
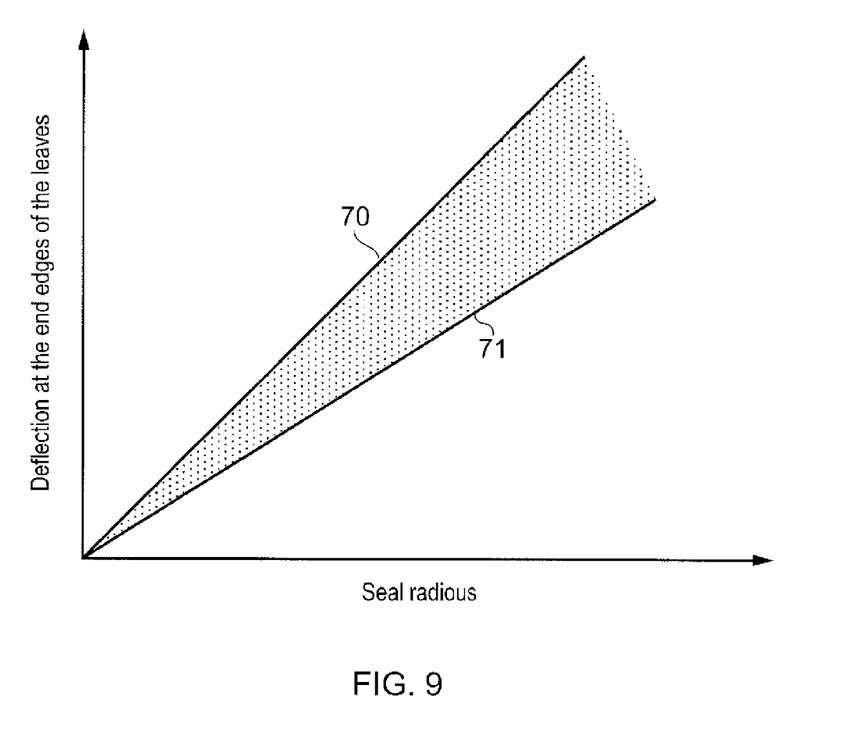
FIG. 9 is a graph of deflection at the end edges of the leaves against seal radius at the end edges and shows schematically upper and lower limits for the maximum amount of deflection that can be tolerated.

In general, the amount of radial deflection that can be tolerated in a seal scales with seal radius. FIG. 9 is a graph of deflection at the end edges of the leaves against seal radius at the end edges and shows schematically upper 70 and lower 71 limits for the maximum amount of deflection that can be tolerated. Typical values for the gradient of the upper limit are 5, 6 or 7 mm of deflection per meter of seal radius, and typical values for the gradient of the lower limit are 0.4, 0.7 or 1 mm of deflection per meter of seal radius. The abutment formations and stop surfaces of the seals discussed above can be arranged such that, for a given seal, the amount of predetermined deflection, $\delta_{lim}$, is located in the shaded region between these limits.

It will be appreciated that in each of the embodiments above, the deflection of the leaves radially outwards is unhindered. That is, the stop portions are only provided on radially inwards of the abutment formations. Thus, the outer radial clearance of the abutment formations is greater than the inner radial clearance. It will be appreciated that the arrangements shown in FIGS. 7a, 7c and 8b have stepped portions rather than transients or projections and as such do not have radially outer clearance.

While the invention has been described in conjunction with the exemplary embodiments described above, many equivalent modifications and variations will be apparent to those skilled in the art when given this disclosure. For example, in FIGS. 4 to 8 abutment formations and corresponding stop portions are shown on both sides of the leaf. However, another option is to provide an abutment formation and corresponding stop portion only one side of the leaf. Accordingly, the exemplary embodiments of the invention set forth above are considered to be illustrative and not limiting. Various changes to the described embodiments may be made without departing from the spirit and scope of the invention.

The invention claimed is:

1. A leaf seal for effecting a seal between two, coaxial, relatively rotating components, the leaf seal comprising:
    an annular pack of stacked leaves, the pack being mountable to a first one of the relatively rotating components at root portions of the leaves and extending towards a second one of the relatively rotating components such that end edges of the leaves are presented for wiping contact with the second one of the relatively rotating components and, in use, a pressure drop is maintained axially across the pack and the leaves are arranged to undergo a predetermined amount of blow-down during normal steady state operating conditions, wherein
    the leaf seal further has a coverplate at the high pressure side of the pack and the low pressure side of the pack, the coverplate covering a portion of the radial extent of the pack, and comprising a respective stop portion at the high pressure side and the low pressure side of the respective leaves;
    some or all of the leaves have respective abutment formations, each abutment formation being arranged to abut the respective coverplate at a stop portion thereof upon radial deflection of the leaf by a predetermined amount during normal use to prevent further radial deflection beyond that amount so as to act as a physical blow-down limiter during the normal use,
    the abutment formation is located at a side edge of the respective leaf between its root portion and its end edge, and
    the abutment formation is a step in the side edge of the leaf or a salient from the side edge.

2. The leaf seal according to claim 1, wherein if R is the radius of the seal in meters at the end edge of the leaf, the predetermined amount of radial deflection in mm of the leaf measured at the end edge is at least 0.4R.

3. The leaf seal according to claim 1, wherein if R is the radius of the seal in meters at the end edge of the leaf, the predetermined amount of radial deflection in mm of the leaf measured at the end edge is at most 5R.

4. The leaf seal according to claim 1, wherein the abutment formation has an abutment surface that is substantially parallel to the axial direction.

5. The leaf seal according to claim 1, wherein the abutment formation has an abutment surface that is inclined to the axial direction.

6. The leaf seal according to claim 1, wherein the abutment formation has an abutment surface which is curved.

7. The leaf seal according to claim 1, wherein the stop portion has a stop surface that is substantially parallel to the axial direction for contact with the abutment surface of the leaf for contact with an abutment surface of the leaf.

8. The leaf seal according to claim 1, wherein the stop portion has a curved stop surface for contact with the abutment surface of the leaf.

9. The leaf seal according to claim 1, wherein the side edges of each leaf comprises an abutment formation taper inwards from the root portion to the end edge.

10. The leaf seal according to claim 1 wherein a clearance radially outwards of the abutment formations is greater than a clearance between the abutment formations and stop portions in normal use.

11. A gas turbine engine comprising one or more leaf seals according to claim 1.

12. A method of effecting a seal between two, coaxial, relatively rotating components, the method comprising:
    mounting the leaf seal of claim 1 to one of the two components;
    rotating the components and maintaining a pressure drop axially across the leaf seal, the rotational speed and pressure drop producing blow-down causing the leaves to deflect radially by the predetermined amount whereby abutment formations on the leaves abut stop portions on corresponding cover plates to prevent further radial deflection beyond that amount.

* * * * *